United States Patent Office 2,694,693
Patented Nov. 16, 1954

2,694,693

PROCESS FOR PREPARING POLYMERS OF VINYL HYDROQUINONE EMPLOYING AZO-BIS-ISOBUTYRONITRILE AS CATALYST

Louis M. Minsk, Rochester, N. Y., assignor to Eastman Kodak Company, Rochester, N. Y., a corporation of New Jersey No Drawing. Application April 15, 1952,
Serial No. 282,489

1 Claim. (Cl. 260—47)

This invention relates to the preparation of polymers and copolymers of vinyl hydroquinone employing azo-bis-isobutyronitrile as the polymerization catalyst.

Polymerized vinyl hydroquinone is described in an article by I. H. Updegraff and H. G. Cassidy, J. A. C. S. 71, 408, February 1949. According to their process, vinyl hydroquinone was polymerized in an evacuated closed vessel by means of heating to a temperature of 125° C. for 100 hours. The product was a brittle solid having an amber color. According to Updegraff and Cassidy, this polymer can advantageously be employed as an electron exchange polymer. Besides the employment of polyvinyl hydroquinone as an electron exchange polymer, it and its interpolymers have other uses such as referred to at the end of this specification. It is obvious that the utility of polymers and interpolymers of vinyl hydroquinone would be substantially improved if a more satisfactory method of formation were developed resulting in the more efficacious production of such products.

In addition to the process described by Updegraff and Cassidy, an article by Wenzke and Nieuwland, J, A. C. S., 46, 180 (1924), discloses that acetylene and hydroquinone unite to form a substance which appeared to polymerize on standing and which would seem to be an impure product comprising polyvinyl hydroquinone; however, Wenzke et al. did not apparently suggest the nature of this product. My investigations have not been conducted according to the methods of Wenzke et al. due to the inherent difficulties of control and purification of the product obtained.

U. S. 2,006,517, dated July 2, 1935, discloses the preparation of vinyl phenols according to a process comprising the reaction of a phenol with a vinyl halide in the presence of a suitable condensing agent such as aluminum chloride. The term "vinyl phenol" is defined as including aromatic compounds having one or more hydroxyl groups attached to the nucleus and having a radical containing the vinyl group. The only examples given are phenol itself and substituted phenols such as cresols, hydrogenated phenols and the like. Processes as described by U. S. 2,006,517 cannot be satisfactorily employed in the preparation of vinyl hydroquinone and polymers thereof; this patent states that the polymerization can be conducted by exposure to light, by heating, or by employing catalysts such as uranium salts, benzoyl peroxide, etc. Regarding our invention, the use of catalysts such as benzoyl peroxide would be entirely unsatisfactory for the polymerization of vinyl hydroquinone since mutual interaction between vinyl hydroquinone and the catalyst would prevent the accomplishment of any useful result.

Thus, there is encountered in the polymerization and interpolymerization of vinyl hydroquinone a major difficulty not normally present in the usual polymerization. Vinyl hydroquinone is a strong reducing agent, of the type often employed to inhibit the polymerization of organic unsaturated compounds. The polymerization of vinyl hydroquinone is therefore self-inhibited. The use of oxidizing catalysts encounters difficulty due to an undesirable interaction together with simultaneous darkening of the mixture.

I have now found that vinyl hydroquinone can be polymerized employing azo-bis-isobutyronitrile, commercially sold as Porofor N. This catalyst has the following structure:

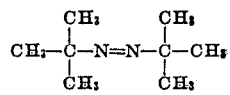

The polymerization employing this catalyst proceeds smoothly, accompanied by only very little discoloration. Using this catalyst, polymers of vinyl hydroquinone have been prepared, as well as interpolymers with unsaturated organic polymerizable compounds containing an aliphatic >C=C< group.

A method for preparing vinyl hydroquinone is described in the article referred to above by Updegraff and Cassidy. Vinyl hydroquinone can also be prepared in accordance with the method described in a copending application, Serial No. 282,456, filed on even date herewith, by D. D. Reynolds and J. L. R. Williams, wherein 2,5-diacetoxystyrene is deacetylated to form vinyl hydroqninone. In addition to employing vinyl hydroquinone in preparing these polymers, it is also advantageous to employ 2,5-diacetoxystyrene whereby polymers and copolymers of vinyl hydroquinone can be prepared by deacetylation of the corresponding polymers and copolymers of 2,5-diacetoxystyrene as described in an application filed on even date herewith by L. M. Minsk, D. D. Reynolds and J. L. R. Williams, Serial No. 282,487.

It is an object of my invention to provide a process for preparing homopolymers of vinyl hydroquinone and interpolymers of vinyl hydroquinone with organic polymerizable unsaturated compounds, especially $\alpha,\beta$-unsaturated organic acids and derivatives of such acids. A further object of my invention is to provide an effective catalyst for the homopolymerization and interpolymerization of vinyl hydroquinone. Other objects of my invention will become apparent hereinafter.

In conducting the polymerization, moderately elevated temperatures from about 40° C. to about 100° C. can advantageously be employed.: However, higher or lower temperatures can also be employed. Th time required for substantial completion of the polymerization reaction depends upon the temperature and varies from just a few hours to several hours; three or four hours is generally sufficient.

A catalytic amount of azo-bis-isobutyronitrile catalyst is employed to effect the polymerization; advantageously from about 1 to about 5% by weight based on the total weight of the monomers being polymerized is employed. Higher or lower percentages can also be employed.

An advantageous method for accomplishing the polymerization is that normally designated as the solution polymerization process. Solvents which can be employed according to this well-known process in general include 1,4-dioxane, lower aliphatic ethers containing from two to ten carbons atoms, aliphatic hydrocarbons such as hexane, cyclohexane, pentane, octane, and other homologous hydrocarbons containing from five to ten carbon atoms, aromatic hydrocarbons such as benzene, toluene, xylene, and other related members of this homologous series containing from six to twelve carbon atoms, and any other inert organic solvent which does not deleteriously affect vinyl hydroquinone or the $\alpha,\beta$-unsaturated organic acid which may also be present therewith.

The reaction of polymerization can advantageously be conducted in a moisture-free inert atmosphere such as nitrogen, etc. However, this is not necessary and can be omitted although it is preferred to exclude moisture to the greatest extent practicable, i. e. the conditions are substantially anhydrous.

The unsaturated organic compounds which can be advantageously be employed in preparing interpolymers can be represented by the following general formulas:

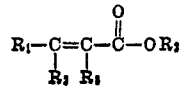

and

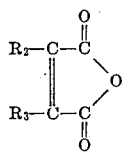

wherein $R_1$ represents a substituent selected from those consisting of a hydrogen atom and a carbalkoxy radical containing from 2 to 7 carbon atoms, $R_2$ represents a substituent selected from those consisting of an alkyl radical containing from 1 to 6 carbon atoms and a hydrogen atom, and $R_3$ represents a substituent selected from those consisting of an alkyl radical containing from 1 to 6 carbon atoms, an aryl radical containing from 6 to 9 carbon atoms and a hydrogen atom. Each of the $R_2$ and $R_3$ substituents in the above formulas can be the same or different. Examples of compounds coming within the scope of the above which can be advantageously interpolymerized with monomeric vinyl hydroquinone are maleic acid anhydride, ethyl maleic acid anhydride, citraconic acid anhydride, phenyl maleic acid anhydride, etc., monomethyl maleate, diethyl maleate, and other esters and half esters of maleic acid and derivatives thereof (e. g. esters and half-esters of citraconic acid), etc., acrylic acid, ethyl acrylate, methyl acrylate, methacrylic acid, methyl methacrylate, butyl methacrylate, methyl ethacrylate, ethyl ethacrylate and other esters of acrylic acid and derivatives of acrylic acid, etc., atropic acid and its esters, etc. These and other interpolymers are disclosed and claimed in a copending application filed on even date herewith, Serial No. 282,488, by Minsk, Reynolds and Williams.

The following examples will serve to illustrate my invention further:

*Example 1.—Homopolymer of vinyl hydroquinone*

One gram of vinyl hydroquinone, one cc. of dry, 1,4-dioxane, and 0.025 gram of azo-bis-isobutyronitrile (Porofor N) were heated together at 85° C. in a tightly stoppered test tube. In four hours the solution had become viscous. The dope which had formed was diluted with 1,4-dioxane and poured into 400 cc. of benzene to precipitate the polymer. The polymer was extracted with benzene and dried in a vacuum desiccator under a constant water pump vacuum. The yield was 0.3 gram of a white pulverulent solid.

*Example 2.—Interpolymer of vinyl hydroquinone and acrylic acid*

One gram of vinyl hydroquinone, one cc. of acrylic acid, one cc. of dry 1,4-dioxane and 0.025 gram of Porofor N. was heated as in Example 1 above. The mixture became viscous and after three hours of heating a viscous dope was obtained. This was diluted with 1,4-dioxane and isolated as in Example 1. The yield was 1.3 grams of a white friable solid. Upon analysis for vinyl hydroquinone by cerium sulfate titration, one gram of this interpolymer was found to contain the equivalent of 0.447 gram of combined vinyl hydroquinone.

*Example 3.—Interpolymer of vinyl hydroquinone and maleic anhydride*

In an all-glass reflex apparatus protected from moisture by a calcium chloride tube was placed 2.72 grams of vinyl hydroquinone, 1.96 grams of maleic anhydride, 0.12 gram of Porofor N, and 19 cc. of dry benzene. The reaction vessel was immersed in a water bath at 60° C. The temperature of the bath was slowly raised. The reactants slowly dissolved to yield a clear, light-yellow solution. At about 87° C. bath temperature, the reaction solution began to grow cloudy and then turned to a slurry. The bath temperature was maintained at 90° C. for 1¼ hours, during which time the mixture was refluxed and the amount of precipitate increased. The mixture was then diluted to 400 cc. with benzene, well stirred, and the solid filtered onto a Büchner funnel. The precipitate was given two additional extractions with 350 cc. of benzene, each for about 1 hour with occasional stirring, followed by filtering onto a Büchner funnel after each extraction. The product was dried in a vacuum desiccator under constant water pump vacuum. The yield was 2.6 grams of light cream-colored friable product. Cerium sulfate titration indicated that each gram of this interpolymer contained the equivalent of 0.297 gram of combined vinyl hydroquinone.

Polymers and interpolymers of vinyl hydroquinone are useful in photographic emulsions as antistain agents and have been found to reduce the stain due to extraneously oxidized developer or to the wandering of oxidized developer. Such utility and means for its accomplishment is disclosed in the copending application filed on even date herewith by L. M. Minsk and W. O. Kenyon, Serial No. 282,490.

In addition to employing vinyl hydroquinone as described hereinabove, nuclear alkyl substituted homologs thereof can also be employed, e. g., methyl vinyl hydroquinone, ethyl vinyl hydroquinone, etc., where the lower alkyl group is attached to the benzene nucleus.

I claim:

A process for preparing polyvinyl hydroquinone as a white pulverulent solid which comprises heating a solution of vinyl hydroquinone and from about 1 to 5 percent by weight thereof of azo bis isobutyronitrile dissolved in 1,4-dioxane to a temperature of from about 85° to about 90° C. under substantially anhydrous conditions, diluting the resultant viscous solution with a sufficient quantity of benzene to form a heterogeneous mixture of solid and liquid, and separating the white pulverulent solid.

References Cited in the file of this patent

UNITED STATES PATENTS

| Number | Name | Date |
|---|---|---|
| 2,471,959 | Hunt | May 31, 1949 |

FOREIGN PATENTS

| Number | Country | Date |
|---|---|---|
| 807,440 | Germany | June 28, 1951 |

OTHER REFERENCES

Updegraff et al.: Jour. Amer. Chem. Soc., vol. 71, pages 407–410 (1949).

Bonsall: Jour. of Polymer Science, vol. 7, pages 39–55, July 1951.

Chemical and Engineering News, vol. 29, page 4942, November 19, 1951.